(12) United States Patent
Parizhsky et al.

(10) Patent No.: US 6,421,388 B1
(45) Date of Patent: *Jul. 16, 2002

(54) METHOD AND APPARATUS FOR DETERMINING PCM CODE TRANSLATIONS

(75) Inventors: Vladimir Parizhsky, New York, NY (US); Dale M. Walsh, Golf; Vitali Vinokour, Chicago, both of IL (US)

(73) Assignee: 3Com Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 58 days.

(21) Appl. No.: 09/085,737

(22) Filed: May 27, 1998

(51) Int. Cl.[7] ................................................ H04B 14/04
(52) U.S. Cl. ........................ 375/243; 341/200; 704/230
(58) Field of Search ................................. 375/243, 245, 375/242, 254, 286, 287; 341/200; 704/212, 230; 348/405, 472

(56) References Cited

U.S. PATENT DOCUMENTS 4,051,470 A * 9/1977 Esteban et al. .............. 341/200
5,991,278 A * 11/1999 Betts ........................... 375/222

* cited by examiner

Primary Examiner—Betsy L. Deppe
(74) Attorney, Agent, or Firm—McDonnell Boehnen Hulbert & Berghoff

(57) ABSTRACT

A method and apparatus for determining the correct decision regions in a PCM communication receiver utilizing a public Digital Telephone Network (DTN). A receiver receives samples from an analog loop of the DTN and quantizes the samples according to a reference lattice. The reference lattice defines a set of decision levels representing the quantization level for each PCM codeword. The receiver sets the reference lattice by scaling the lattice to account for the characteristics of the communication channel, which typically includes distortions of the digital data resulting in nonlinear behavior of the channel. The scaling and re-scaling thus accounts for PCM codeword translations or other channel distortion.

24 Claims, 4 Drawing Sheets

METHOD AND APPARATUS FOR DETERMINING PCM CODE TRANSLATIONS

BACKGROUND OF THE INVENTION

A. Field of the Invention

The present invention relates to a method and device for determining pulse code modulation (PCM) codeword translations imposed on signals used in a PCM data communication system. The communication system of particular interest herein uses the public digital telephone network (DTN) to transmit data. The presence of Robbed-Bit-Signaling (RBS) and/or a Network Digital Attenuators (NDA) within the DTN impacts negatively upon the communication system performance. Determining the presence of translations in the system allows the communication devices to minimize the impact of the translations and fully utilize the available PCM codewords.

B. Description of the Related Art

For many years the public digital telephone network (DTN) has been used for data transmission between modems. Typically, a modulated carrier is sent over a local loop to a service provider (e.g., a Regional Bell Operating Company), whereupon the service provider quantizes the signal for transmission through the DTN. A service provider that is located near the receiving location converts the digital signal back to an analog signal for transmission over a local loop to the receiving modem. This system is limited in the maximum achievable data rate at least in part by the sampling rate of the quantizers, which is typically 8 kHz (which rate is also the corresponding channel transmission rate, or clock rate, of the DTN).

Furthermore, the analog-to-digital (A/D) and digital-to-analog (D/A) conversions are typically performed in accordance with a non-linear quantizing rule. In North America, this conversion rule is known as $\mu$-law. A similar non-linear sampling technique known as A-law is used in certain areas of the world such as Europe. The nonlinear A/D and D/A conversion is generally performed by a codec (coder/decoder) device located at the interfaces between the DTN and local loops. Alternatively, these devices are referred to herein as a DAC (digital-to-analog converter) and an ADC (analog-to-digital converter).

It has been recognized that a data distribution system using the public telephone network can overcome certain aspects of the aforesaid limitations by providing a digital data source connected directly to the DTN, without an intervening codec. In such a system, the telephone network routes digital signals from the data source to a client's local subscriber loop without any intermediary analog facilities, such that the only analog portion of the link from the data source to the client is the client's local loop (plus the associated analog electronics at both ends of the loop). The only codec in the transmission path is the one at the DTN end of the client's subscriber loop.

FIG. 1 shows a block diagram of a data distribution system. The system includes a data source 10, or server, having a direct digital connection 30 to a digital telephone network (DTN) 20. A client 40 is connected to the DTN 30 by a subscriber loop 50 that is typically a two-wire, or twisted-pair, cable. The DTN routes digital signals from the data source 10 to the client's local subscriber loop 50 without any intermediary analog facilities such that the only analog portion of the link from the server 10 to the client 40 is the subscriber loop 50. The analog portion thus includes the channel characteristics of the subscriber loop 50 plus the associated analog electronics at both ends of the subscriber loop 50. The analog electronics are well known to those skilled in the art and typically include a subscriber line interface card at the central office that includes a codec, as well as circuitry used to generate and interpret call progress signals (ring voltage, on-hook and off-hook detection, etc.). In the system of FIG. 1, the only codec in the transmission path from the server 10 to the client 40 is a DAC located at the DTN 20 end of the subscriber loop 50. It is understood that the client-side, or subscriber-side, equipment may incorporate an ADC and DAC for its internal signal processing, as is typical of present day modem devices. For the reverse channel, the only ADC converter in the path from the client 40 to the server 10 is also at the DTN 20 end of the subscriber loop 50.

In the system of FIG. 1, the server 10, having direct digital access to the DTN 20 may be a single computer, or may include a communications hub that provides digital access to a number of computers or processing units. Such a hub/server is disclosed in U.S. Pat. No. 5,528,595, issued Jun. 18, 1996, the contents of which are incorporated herein by reference. Another hub/server configuration is disclosed in U.S. Pat. No. 5,577,105, issued Nov. 19, 1996, the contents of which are also incorporated herein by reference.

In the system shown in FIG. 1, digital data can be input to the DTN 20 as 8-bit bytes (octets) at the 8 kHz clock rate of the DTN. This is commonly referred to as a DS-0 signal format. At the interface between the DTN 20 and the subscriber loop 50, the DTN 20 codec converts each byte to one of 255 analog voltage levels (two different octets each represent 0 volts) that are sent over the subscriber loop 50 and received by a decoder at the client's location. The last leg of this system, i.e., the local loop 50 from the network codec to the client 40, may be viewed as a type of baseband data transmission system because no carrier is being modulated in the transmission of the data. The baseband signal set contains the positive and negative voltage pulses output by the codec in response to the binary octets sent over the DTN. The client 40, as shown in FIG. 1, may be referred to herein as a PCM modem.

FIG. 3 shows a $\mu$-law to linear conversion graph for one-half of the $\mu$-law codeword set used by the DTN 20 codec. This conversion is fully defined in ITU-T Recommendation G.711 (1988), Pulse Code Modulation (PCM) of Voice Frequencies, the contents of which are hereby incorporated herein by reference. As shown in FIG. 3, the analog voltages corresponding to the quantization levels are non-uniformly spaced and follow a generally logarithmic curve. It should be noted that the analog voltages are represented in FIG. 3 as decimal values based on a 16 bit conversion. This is only for illustrative purposes, and 12 bits may be used as set forth in G.711. In other words, the increment in the analog voltage level produced from one codeword to the next is not linear, but depends on the mapping as shown in FIG. 3, and Recommendation G.711. Note that the vertical scale of FIG. 3 is calibrated in integers from 0 to 32,124. These numbers correspond to a linear 16-bit A/D converter. As is known to those of ordinary skill in the art, the sixteenth bit is a sign bit which provides integers from 0 to −32124 which correspond to octets from 0 to 127, not shown in FIG. 3. Thus FIG. 3 can be viewed as a conversion between the logarithmic binary data and the corresponding linear 16-bit binary data. It can also be seen in FIG. 3 that the logarithmic function of the standard conversion format is approximated by a series of 8 linear segments.

The conversion from octet to analog voltage (or a digital representation of the analog voltage, as discussed above) is well known, and as stated above, is based on a system called μ-law coding in North America and A-law coding in Europe. Theoretically, there are 256 points represented by the 256 possible octets, or μ-law codewords. The format of the μ-law codewords is shown in FIG. 2, where the most significant bit $b_7$ indicates the sign, the three bits $b_6$–$b_4$ represent the linear segment, and the four bits, $b_0$–$b_3$ indicate the step along the particular linear segment. These points are symmetric about zero; i.e., there are 128 positive and 128 negative levels, including two encodings of zero. Since there are 254 non-zero points, the maximum number of bits that can be sent per signaling interval (symbol) is just under 8 bits. A μ-law or A-law codeword may be referred to herein as a PCM codeword. It is actually the PCM codeword that results in the DTN 20 codec to output a particular analog voltage. The codeword and the corresponding voltage may be referred to herein as "points."

Other factors, such as robbed-bit signaling, digital attenuation (pads), channel distortion and noise introduced by the subscriber loop, and the crowding of points at the smaller voltage amplitudes and the associated difficulty in distinguishing between them at the decoder/receiver, may reduce the maximum attainable bit rate. Robbed Bit Signaling (RBS) involves the periodic use of the least significant bit (LSB) of the PCM codeword by the DTN 20 to convey control information. Usually the robbed bit is replaced with a logical '1' before transmission to the client 40. The DTN may also replace the LSB alternately with a '1', and then a '0'. Additionally, in an RBS interval, a codec may produce an analog voltage level that is between levels corresponding to valid codewords. This is referred to herein as ½ bit RBS.

The DTN performs RBS on a cyclic basis, robbing the LSB of an individual channel every sixth PCM codeword. In addition, due to the fact that a channel might traverse several digital networks before arriving at the terminus of the DTN 20, more than one PCM codeword per 6 time slots could have a bit robbed by the network in the case where each network link robbing a different LSB. Of course, at most only one time slot may suffer from ½ bit RBS.

To control power levels, some networks impose digital attenuators that act on the PCM codewords to convert them to different values. Unlike most analog attenuators, a network digital attenuator (NDA) is not linear. Because there is a finite number of digital levels to choose from, the NDA will be unable to convert each codeword to a unique, lower (or higher) magnitude codeword. The analog level ultimately transmitted by the codec over the subscriber loop 50 corresponds to the translated codeword.

RBS, ½ bit RBS, and NDAs can coexist in many combinations. For example, a PCM interval could have a robbed bit of type '1', followed by an NDA followed by a ½ bit RBS link.

It is evident that the above-described data transmission system may alter the points that are used to transmit data through the system: e.g., LSBs may be robbed during some time slots thereby making some points unavailable in that time slot; digital attenuators may make some points ambiguous; the codec may not generate the analog voltages accurately; and, noise on the local loop may prevent the use of closely spaced points for a desired error rate. Thus it is desirable to be able to determine which codewords are usable in spite of the PCM codeword translations, so that the communication devices may operate efficiently.

SUMMARY OF THE INVENTION

The present invention provides a method and apparatus for determining the characteristic response of a communication channel that utilizes the public Digital Telephone Network (DTN). In a communication system having a transmitter that supplies digital information directly to the DTN in the form of PCM codewords, and having a receiver connected to the DTN via an analog loop, any PCM codeword translation imposed by the DTN must be accounted for. Specifically, the translations imposed on PCM codewords traversing such a system must be detected or errors will result. The channel includes the DTN, which may have Network Digital Attenuators (NDA) and/or Robbed Bit Signalling (RBS), and a Digital-to-Analog Converter (DAC), (also known as a codec), as well as the analog characteristics of the local loop, typically a twisted pair of copper wires. The translation detection is especially useful in so-called PCM modulation schemes that utilize the DTN, where knowledge of codeword translations predicates the selection of available PCM codes used to represent data. This information is also useful when the data receiver, or PCM modem, makes determinations of which codes were actually sent by a transmitter, thus resolving the ambiguities imposed by PCM codeword translation.

Once the translation effects have been accounted for, the decision regions with the receiver's quantizer may be updated to account for the characteristics of the particular codec in use on the analog subscriber loop by the DTN.

BRIEF DESCRIPTION OF THE DRAWINGS

The objects, features and advantages of the present invention will be more readily appreciated upon reference to the following disclosure when considered in conjunction with the accompanying drawings, in which.

DETAILED DESCRIPTION OF THE PREFERRED EMBODIMENT

Figure 1:
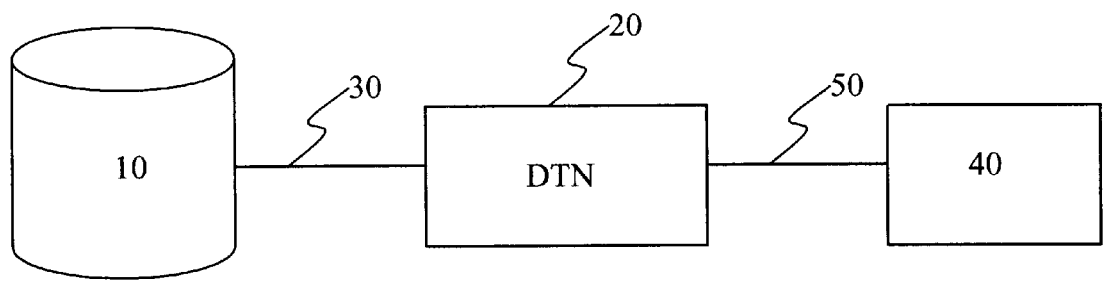
FIG. 1 depicts a communications network with a data source having direct digital access to the DTN.
Figure 2:
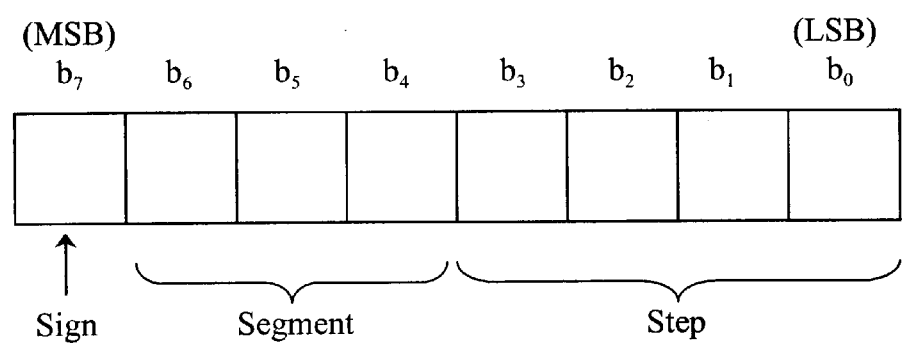
FIG. 2 shows the elements of a μ-law codeword.
Figure 4:
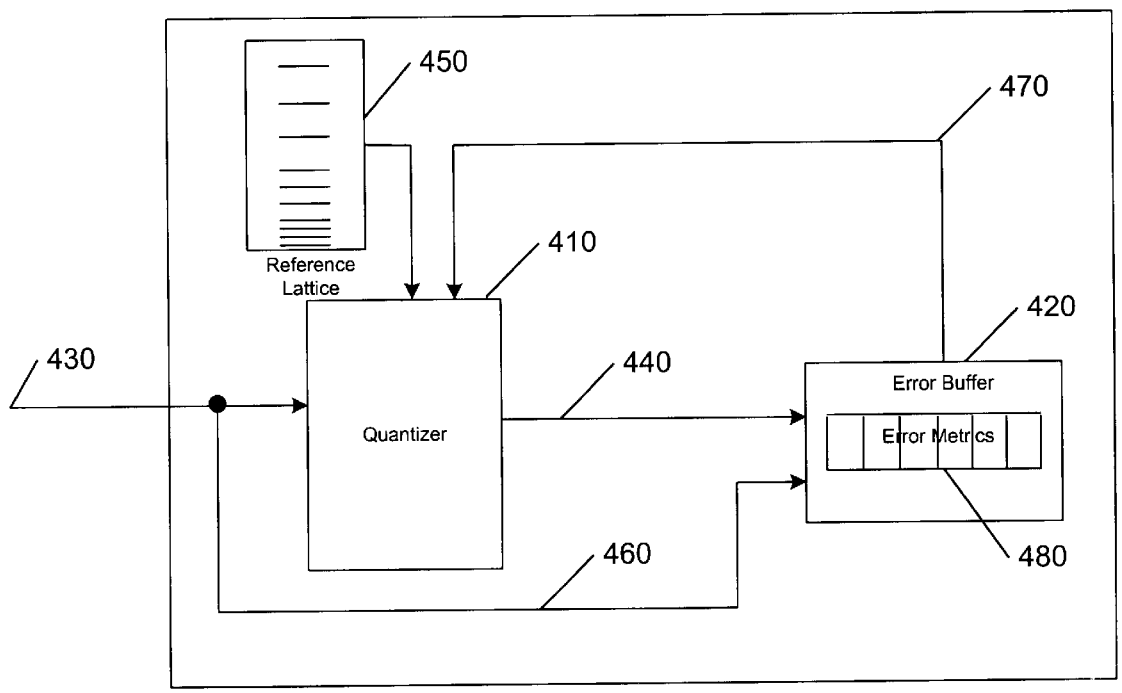
FIG. 4 shows a block diagram of a preferred embodiment of the translation detection device.

A preferred PCM codeword translation detection device 400 for use in a PCM receiver is shown in FIG. 4. The receiver is connected to the digital telephone network 20 by an analog loop 50 in the same manner as the client 40, as shown in FIG. 1. The receiver receives data from a digital data source 10 connected directly to the digital telephone network 20. The receiver samples the incoming symbols and provides the samples to the translation detection device 400 of FIG. 4. The symbols may have been translated by network devices such as digital attenuators, also referred to as digital pads, and by robbed-bit signaling. In addition, the symbols have undergone an unknown attenuation associated with the analog loop 50 and the analog front-end and analog-to-digital conversion of the PCM receiver.

The translation detection device 400 includes a quantizer 410 and an error buffer 420. The quantizer 410 accepts samples corresponding to the translated PCM codewords on line 430, and provides quantized samples on line 440 to the error buffer 420. The quantizer 410 determines which valid codeword is nearest to the sample input based on decision regions used within the quantizer 410. The error buffer 420 is connected to the quantizer 410 and receives both samples and quantized samples in order to compute the error imposed by the quantizer. The decision regions within quantizer 410 are repeatedly adjusted and the points are re-quantized after each adjustment. The error metrics within the error buffer 420 are then checked to determine which decision region results in the lowest error.

The quantizer decision regions are preferably initialized at the beginning of operation while a probing sequence is received. The probing sequence preferably includes codewords having a variety of magnitudes. Once such sequence is specified in U.S. Pat. No. 5,970,089, issued Oct. 19, 1999, the contents of which are hereby incorporated herein by reference. Other sequences may also be used, such as that set forth in ITU Recommendation V.90, the contents of which are also hereby incorporated herein by reference.

The probing signal specified in the above-referenced application has constituent components of a sequence of signal values and a kernel. The kernel is a type of probing frame template that is used to generate the probing signal. The kernel is made up of positive and negative one (±1) and zero (0) elements that define the basic pattern of symbols, or signal values, within a probing frame. The probing signal values are the PCM codes that are being probed. The sequence of signal values is used with the kernel to generate a sequence of probing frames, one frame for each value. To generate one frame of the probing signal, all the elements of the kernel are multiplied (in the linear, symbol-by-symbol sense) by one of the values to be probed. Additional frames of the probing signal are generated in a similar manner, one frame for each value to be probed. The PCM codes that make up the probing signal are sent from an encoder to the DTN, and ultimately to a DAC at one end of a subscriber loop, where they are converted to analog levels.

The kernel consists of alternating positive and negative impulses that will correspond to positive and negative valued codewords of the probing signal. Interposed between the positive and negative pulses (or codewords) are periods of intervening zero values. The use of intervening zeroes minimizes the effects of intersymbol interference.

The sequence of values, or magnitudes, to be multiplied by the kernel is dependent on the system. In a PCM system that uses the DTN, it is often desirable to probe all the values that are to be used as data symbols, or all of those values that are initial candidates for data symbols. Some of the PCM codeword candidates may eventually be unusable depending upon the nature of the network and codec distortion. Furthermore, it is also desirable to probe the smaller levels with multiple repetitions of the kernel, as the smaller levels are closer together. The probing of all the PCM codewords that are to be used allows the receiver to make more accurate decisions when in normal operation. It is also desirable to alternate large and small values in some sequence if there is no other signal present, to avoid turning on the network echo-canceling circuitry. A progressive alternation of signal values is used:

LV, SV, LV−1, SV+1, LV−2, SV+2, etc.;

where LV is the largest signal value, LV−1 is the second largest signal value, etc. and SV is the smallest signal value and SV+1 is the second smallest signal value, etc.

Alternatively, a subset of the values may used to generate the probing signal. The subset must consist of enough values to allow the receiver to determine the nature of the network distortion. For most cases, it has been found empirically that a subset having three values is sufficient to determine the nature of the network distortion.

Figure 3:
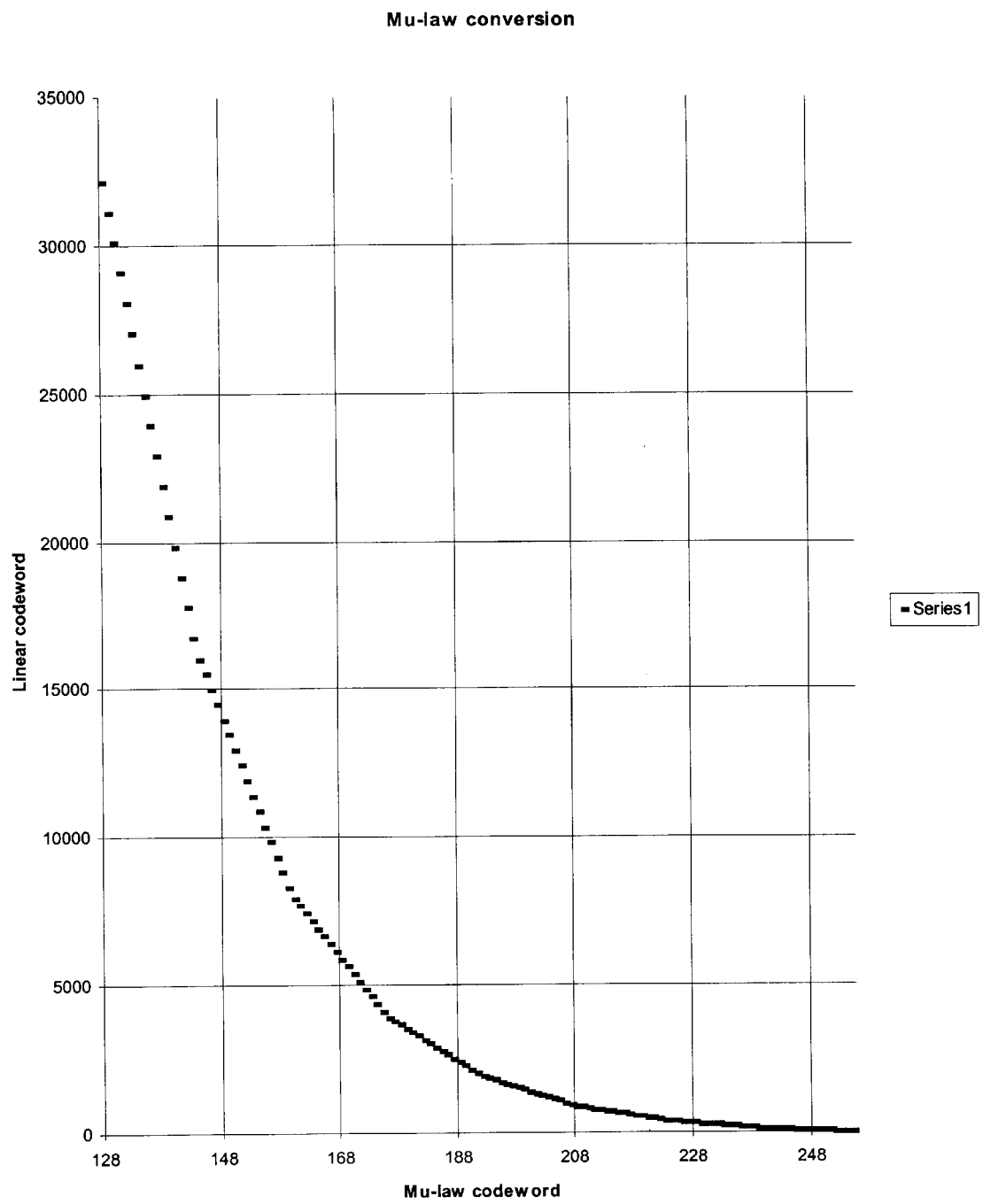
FIG. 3 shows a μ-law to linear conversion graph.

In the preferred embodiment of the quantizer 410, the decision regions are determined with the use of a reference lattice 450. Reference lattice 450 is a representation of all valid PCM codewords, preferably normalized such that the largest point is equal to, e.g., 1.0, and all other points are scaled accordingly. As previously mentioned, FIG. 3 depicts one half of the available codewords. The reference lattice is used to specify the center points of the decision regions for the quantizer 410. The actual decision regions generally extend half the distance to the next higher and lower point, or codeword, on the lattice. Any received point may then be quantized to the nearest point by simply determining the region in which it falls.

The decision regions are initialized and subsequently adjusted by scaling the reference lattice by a factor determined by at least one received point. The scaled lattice is then used to define the centers of the decision regions. Of course, it will be understood by one of ordinary skill that the same effect may be had by scaling the data.

The scaling of the reference lattice is determined by making an initial assumption about a selected received point. A received point is selected, and the point is assumed to correspond to a reference point on the lattice. Preferably, the transmitter transmits a point know to the receiver. Of course the receiver will not know whether the point was translated. The receiver makes an initial assumption that the point was not translated, and that it still corresponds to the known transmitted point.

Once the two points are chosen, a scaling factor is determined by forming the ratio of the reference point to the selected point. The scaling factor is then used to scale the reference lattice such that the selected point falls directly on, or corresponds directly to, the scaled reference lattice point. Assuming a known transmitted point is used and no translations have occurred, the scaling factor will be largely representative of the unknown attenuation associated with the analog loop 50 and the analog front-end and analog-to-digital conversion of the PCM receiver.

Error buffer 420 calculates an error metric representative of the error imposed by quantizer 410. The error buffer receives the quantized samples on line 440 and the unquantized samples on line 460. The error metric may be the magnitude of the difference between the quantized and unquantized point, the square of the difference, or another suitable error measure.

The error buffer 420 preferably includes a set of error metrics 480 for each lattice reference point, each element of the set containing a separate error metric for each time slot. To accommodate DTN links that use ½ bit RBS, which causes the codec to output a linear value that does not correspond to a valid codeword, the error buffer may disregard the element having the highest value when determining an overall error metric for a given lattice reference point. The set of error metrics for each lattice reference point is therefore six elements long, or any multiple of six, because RBS, if present, occurs on every sixth time slot of the DTN channel.

The decision regions are then adjusted by forming the ratio between the selected received point and a new lattice reference point. The received points are re-quantized, and the error metrics are calculated and stored. Every possible point on the reference lattice may be chosen and the corresponding errors are calculated. Preferably, however, when a known transmitted codeword is used as the selected sample, only those points on the reference lattice are used that correspond to codewords having twice the magnitude (plus 3 dB) or one-eighth the magnitude (−9 dB). It has been found empirically that this range of codewords is reasonable to encounter on typical DTN links with NDAs. Finally, the lattice reference point resulting in the smallest error metric is selected, and this is conveyed to the quantizer 410 on line 470. The corresponding decision regions are determined to be the correct regions.

The translation detector 400 works as follows: for the correct lattice reference point, all received sample points will correspond directly to points on the scaled reference lattice. The error buffer calculation will result in a small quantization error (below any other error metric for the other lattice reference points) indicating that the translation detector has identified the translation and determined the correct decision regions. For all other lattice reference points, the points will not generally correspond to the points on the scaled lattice, and result in a high error metric.

The selected point may be chosen randomly, but preferably is of relatively high magnitude. If chosen from among the other received points during the probing sequence, the selected point preferably has a relatively high magnitude compared to all the received points. This will decrease the effects of additive noise. If a low magnitude point is selected and used to scale the entire lattice for decision purposes, any error due to noise, sampling offset, etc., will be magnified in the larger magnitude lattice points. Therefore, to minimize the error due to noise, a point that is higher in magnitude than at least one half of the received points is preferred. Similarly, the choice of the initial reference point may be selected arbitrarily.

To further reduce the effects of noise, an average of more than one sample point of similar magnitude may be used to determine the scaling factor. The sample points should be close enough that it is reasonable to assume they represent the same codeword. Again, large magnitude codewords are preferred, as they are spaced farther apart.

It should be noted that some DTN channels cause the codec to output a signal voltage that is halfway between valid codewords. While the channel may traverse numerous RBS links, only the last one is capable of inserting an invalid codeword due to ½ bit RBS. Thus, an invalid codeword may only occur in one out of every six time slots. If the initial point used to scale the reference lattice corresponds to such a ½ bit RBS point, then the translation detector will never converge on the correct lattice scaling. One technique of avoiding the selection of a ½ bit RBS point is to select the initial point using specific criteria. For example, of the set of points available (considering only those having a large magnitude), a point is selected that appears to have been repeated (i.e., two points are within a certain distance from each other), and the repeated point is displaced by other than a multiple of six time slots. This will ensure that the selected point is a valid codeword and does not correspond to an RBS time slot.

It is understood that once the nature of the translation has been determined, the receiver must then determine which actual codewords may be used without ambiguity and convey this to the transmitter. As stated above, digital pads may map more than one codeword to a translated codeword. The translation detector determines the appropriate lattice scaling that allows the PCM receiver to determine which codeword was received. If the receiver has knowledge of the transmitted sequence, it can easily determine which codewords the transmitter may use.

Figure 5:
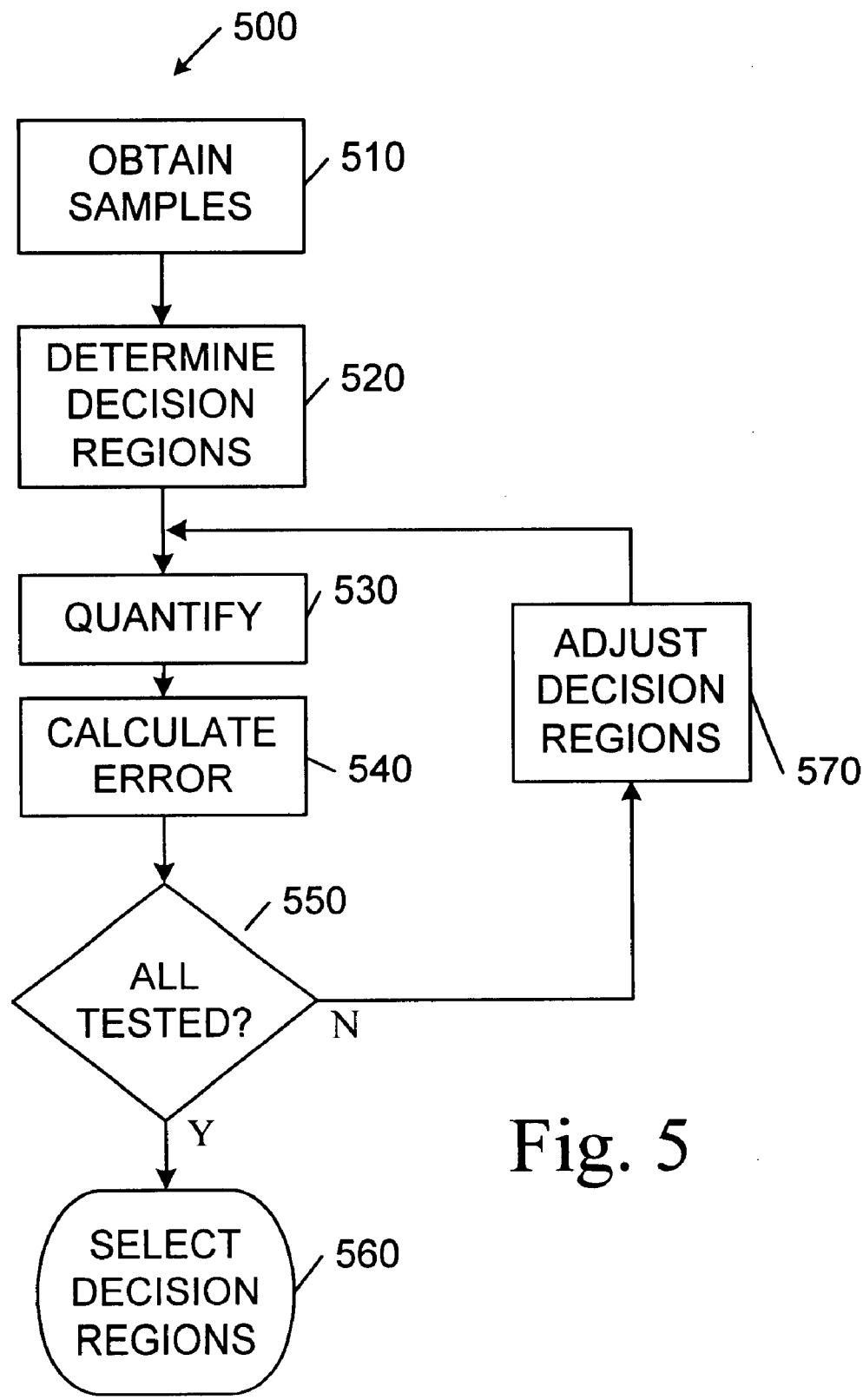
FIG. 5 shows a flowchart of the preferred method of codeword translation detection.

FIG. 5 depicts a flowchart of the method 500 of determining PCM codeword translations. At step 510, samples of a received signal voltage are obtained. The samples represent a sequence of translated PCM codewords that have been sent over the DTN and converted to an analog voltage at the central office. At step 520 the decision regions are determined in response to at least one received sample. At step 530 the samples are quantizied to the nearest valid PCM codeword using the decision regions. At step 540 the quantizer error is calculated by comparing the samples to the quantizied samples. This may include calculating the difference between the sample and the quantized sample, forming the absolute value or square of the difference, and summing over all points. The sum may also be done for each time slot separately and then forming an overall error metric. The overall metric may be based on less than all of the time slots. At step 570 the decision regions are adjusted unless all possible translations have been tested, and a corresponding error metric calculated. If all possible (or desirable) reference lattice points have been tested, as determined in step 550, the lattice scaling having the smallest error is selected in step 560.

Step 520 preferably involves forming the ratio of a selected sample and a reference point from the reference lattice, and scaling the reference lattice by the ratio. Step 520 may also include selecting the sample based in part on its magnitude, where the selected sample has a magnitude that is larger than approximately one half of available samples. Step 520 may also be done in response to an average of a plurality of selected samples that are all of similar magnitude. The points may be averaged so the noise contribution tends to cancel itself out. Step 570 preferably involves selecting a new reference point from the reference lattice, forming a new ratio, and scaling the reference lattice with the new ratio. Alternatively, step 570 may be achieved by scaling the samples prior to the quantizing step. The quantizer error in step 540 is preferably formed from a set of N error components, each error component based on every $N^{th}$ sample, where N is typically 6, or a multiple of 6. Furthermore, the largest quantizer error component is typically discarded to account for ½ bit RBS time slots. Steps 530, 540 and 570 are performed repeatedly until all desired reference lattice points are tested as determined in step 550.

A preferred embodiment of the present invention has been described herein. It is to be understood, of course, that changes and modifications may be made in the embodiment without departing from the true scope of the present invention, as defined by the appended claims.

We claim:

1. A method of determining decision regions in a communication receiver connected to a digital telephone network by an analog loop comprising the steps of:

obtaining samples of a received signal voltage from a digital network, the samples representing a sequence of PCM codewords;

determining at least one decision region within a reference lattice in response to at least one sample;

quantizing the samples to a nearest valid PCM codeword using said at least one decision region within the reference lattice;

calculating quantizer error by comparing the samples to the quantized samples;

adjusting the reference lattice;

adjusting said at least one decision region within the adjusted decision lattice;

re-quantizing the samples using the adjusted reference lattice;

re-calculating quantizer error by comparing the samples to the re-quantized samples; and selecting a final reference lattice for use in the receiver in response to the calculated and re-calculated quantizer error thereafter, quantizing all received samples using the final reference lattice.

2. The method of claim 1, wherein the step of determining at least one decision region within the reference lattice comprises forming the ratio of a selected sample and a reference point from the reference lattice and scaling the reference lattice by the ratio.

3. The method of claim 2, wherein the adjusting said at least one decision region step comprises selecting a new reference point from the reference lattice, forming a new ratio, and scaling the reference lattice with the new ratio.

4. The method of claim 2 wherein the selected sample is chosen based in part on its magnitude.

5. The method of claim 4 wherein the selected sample has a magnitude that is larger than magnitudes of approximately one half of available samples.

6. The method of claim 1, wherein the step of adjusting the reference lattice comprises scaling the samples prior to the re-quantizing step.

7. The method of claim 1, wherein the steps of quantizing the samples to the nearest valid PCM codeword using the reference lattice, calculating quantizer error by comparing the samples to the quantized samples, and adjusting the reference lattice, are performed repeatedly to obtain the lowest quantizer error.

8. A method of determining decision regions in a communication receiver connected to a digital telephone network by an analog loop comprising the steps of:
  obtaining samples of a received signal voltage, the samples representing a sequence of PCM codewords;
  determining a reference lattice in response to at least one sample;
  quantizing the samples to a nearest valid PCM codeword using the reference lattice;
  calculating quantizer error by comparing the samples to the quantized samples;
  adjusting the reference lattice;
  re-quantizing the samples using the adjusted reference lattice;
  re-calculating quantizer error by comparing the samples to the re-quantized samples;
  selecting a final reference lattice for use in the receiver in response to the calculated and re-calculated quantizer error; and
  wherein the step of determining the reference lattice is done in response to an average of a plurality of selected samples that are all of similar magnitude.

9. A method of determining decision regions in a communication receiver connected to a digital telephone network by an analog loop comprising the steps of:
  obtaining samples of a received signal voltage, the samples representing a sequence of PCM codewords;
  determining a reference lattice in response to at least one sample;
  quantizing the samples to a nearest valid PCM codeword using the reference lattice;
  calculating quantizer error by comparing the samples to the quantized samples;
  adjusting the reference lattice;
  re-quantizing the samples using the adjusted reference lattice;
  re-calculating quantizer error by comparing the samples to the re-quantized samples; and
  wherein the step of adjusting the reference lattice comprises scaling the reference lattice.

10. A method of determining decision regions in a communication receiver connected to a digital telephone network by an analog loop comprising the steps of:
  obtaining samples of a received signal voltage, the samples representing a sequence of PCM codewords;
  determining a reference lattice in response to at least one sample;
  quantizing the samples to a nearest valid PCM codeword using the reference lattice;
  calculating quantizer error by comparing the samples to the quantized samples;
  adjusting the reference lattice;
  re-quantizing the samples using the adjusted reference lattice;
  re-calculating quantizer error by comparing the samples to the re-quantized samples; and
  wherein the quantizer error is formed from a set of N error components, each error component based on every Nth sample.

11. The method of claim 10, wherein N is a multiple of 6.

12. The method of claim 10, wherein the largest quantizer error component is discarded.

13. A PCM codeword translation detection device for use in a PCM receiver, where the receiver is connected to a digital telephone network by an analog loop, and receives data from a digital data source connected directly to the digital telephone network, said PCM codeword translation detection device comprising:
  a quantizer having a reference lattice corresponding to valid codewords, wherein said quantizer accepts samples corresponding to translated PCM codewords and responsively provides quantized samples based on said reference lattice, and where said quantized samples correspond to a valid codeword nearest to said samples;
  an error buffer connected to said quantizer for receiving said samples and said quantized samples and computing the error imposed by said quantizer;
  wherein said quantizer is repeatedly adjusted to obtain the smallest error and wherein said quantizer determines a final reference lattice, said final reference lattice being used thereafter to quantize all subsequently received data from said data source.

14. The translation detection device of claim 13, wherein the largest quantizer error component is discarded.

15. A PCM codeword translation detection device for use in a PCM receiver, where the receiver is connected to a digital telephone network by an analog loop, and receives data from a digital data source connected directly to the digital telephone network, said PCM codeword translation detection device comprising:
  a quantizer having a reference lattice corresponding to valid codewords, wherein said quantizer accepts samples corresponding to translated PCM codewords and responsively provides quantized samples based on said reference lattice, and where said quantized samples correspond to a valid codeword nearest to said samples;
  an error buffer connected to said quantizer for receiving said samples and said quantized samples and computing the error imposed by said quantizer; and
  wherein said quantizer is repeatedly adjusted to obtain the smallest error and wherein said reference lattice is initialized using at least one selected sample and a first reference-lattice point.

16. The translation detection device of claim 15, wherein said quantizer is repeatedly adjusted by reinitializing said reference lattice using said at least one selected sample and a plurality of reference-lattice points.

17. The translation detection device of claim 15, wherein said at least one selected sample is chosen based in part on its magnitue.

18. A PCM codeword translation detection device for use in a PCM receiver, where the receiver is connected to a digital telephone network by an analog loop, and receives data from a digital data source connected directly to the digital telephone network, said PCM codeword translation detection device comprising:

a quantizer having a reference lattice corresponding to valid codewords, wherein said quantizer accepts samples corresponding to translated PCM codewords and responsively provides quantized samples based on said reference lattice, and where said quantized samples correspond to a valid codeword nearest to said samples;

an error buffer connected to said quantizer for receiving said samples and said quantized samples and computing the error imposed by said quantizer; and wherein said reference lattice is initialized by scaling said samples, said scaling performed based on a ratio of at least one selected sample and a first reference-lattice point.

19. The translation detection device of claim 18, wherein said quantizer is repeatedly adjusted by re-scaling said samples, said re-scaling performed based on a ratio of said at least one selected sample and a second reference-lattice point.

20. The translation detection device of claim 18, wherein said at least one selected sample is chosen based in part on its magnitude.

21. A PCM codeword translation detection device for use in a PCM receiver, where the receiver is connected to a digital telephone network by an analog loop, and receives data from a digital data source connected directly to the digital telephone network, said PCM codeword translation detection device comprising:

a quantizer having a reference lattice corresponding to valid codewords, wherein said quantizer accepts samples corresponding to translated PCM codewords and responsively provides quantized samples based on said reference lattice, and where said quantized samples correspond to a valid codeword nearest to said samples;

an error buffer connected to said quantizer for receiving said samples and said quantized samples and computing the error imposed by said quantizer; and wherein said reference lattice is initialized using an average of a plurality of selected samples that are all of similar magnitude.

22. A PCM codeword translation detection device for use in a PCM receiver, where the receiver is connected to a digital telephone network by an analog loop, and receives data from a digital data source connected directly to the digital telephone network, said PCM codeword translation detection device comprising:

a quantizer having a reference lattice corresponding to valid codewords, wherein said quantizer accepts samples corresponding to translated PCM codewords and responsively provides quantized samples based on said reference lattice, and where said quantized samples correspond to a valid codeword nearest to said samples;

an error buffer connected to said quantizer for receiving said samples and said quantized samples and computing the error imposed by said quantizer; and wherein said error buffer contains a set of N error components, each error component based on every Nth sample.

23. The translation detection device of claim 22, wherein N is a multiple of 6.

24. A PCM codeword translation detection device for use in a PCM receiver, where the receiver is connected to a digital telephone network by an analog loop, and receives data from a digital data source connected directly to the digital telephone network, said PCM codeword translation detection device comprising:

a quantizer having a reference lattice corresponding to valid codewords, wherein said quantizer accepts samples corresponding to translated PCM codewords and responsively provides quantized samples based on said reference lattice, and where said quantized samples correspond to a valid codeword nearest to said samples;

an error buffer connected to said quantizer for receiving said samples and said quantized samples and computing the error imposed by said quantizer; and wherein said reference lattice is repeatedly adjusted using at least one selected sample and a plurality of reference-lattice points, said plurality of reference-lattice points corresponding to points that are 3 dB higher or 9 dB lower than said selected sample.

* * * * *